(12) United States Patent
Fradet

(10) Patent No.: US 8,528,866 B2
(45) Date of Patent: Sep. 10, 2013

(54) HARNESS WITH ADJUSTABLE BACK STRAP

(76) Inventor: Eric Fradet, Le Tignet (FR)

( * ) Notice: Subject to any disclaimer, the term of this patent is extended or adjusted under 35 U.S.C. 154(b) by 369 days.

(21) Appl. No.: 13/022,059

(22) Filed: Feb. 7, 2011

(65) Prior Publication Data
US 2011/0127381 A1 Jun. 2, 2011

(51) Int. Cl.
*B64D 17/22* (2006.01)
*B64D 17/30* (2006.01)
*B64D 17/36* (2006.01)

(52) U.S. Cl.
USPC .............. 244/151 R; 244/151 A; 244/147; 244/148

(58) Field of Classification Search
USPC ......... 244/151 R, 151 A, 147, 148; 182/3–9, 182/65.1, 133–136; 119/857; 224/153
See application file for complete search history.

(56) References Cited

U.S. PATENT DOCUMENTS

| | | | | |
|---|---|---|---|---|
| 3,692,262 A | * | 9/1972 | Gaylord | 244/151 A |
| 3,757,744 A | * | 9/1973 | Pravaz | 182/3 |
| 4,042,194 A | * | 8/1977 | Frost et al. | 244/151 A |
| 4,090,683 A | * | 5/1978 | Derrien et al. | 244/151 R |
| 4,213,549 A | * | 7/1980 | Hibbard | 224/601 |
| 4,378,921 A | * | 4/1983 | Allen et al. | 244/151 R |
| 4,562,623 A | * | 1/1986 | Jeswine | 24/579.11 |
| 4,687,160 A | * | 8/1987 | Logemann | 244/142 |
| 4,720,064 A | * | 1/1988 | Herndon | 244/122 AG |
| 4,746,084 A | * | 5/1988 | Strong | 244/151 R |
| 4,938,436 A | * | 7/1990 | Bradley et al. | 244/151 R |
| 5,080,191 A | * | 1/1992 | Sanchez | 182/3 |
| 5,127,610 A | * | 7/1992 | Provasoli | 244/151 R |
| 5,277,348 A | * | 1/1994 | Reid | 244/151 R |
| 5,289,896 A | * | 3/1994 | Giglio | 182/3 |
| 5,301,903 A | * | 4/1994 | Aronne | 244/122 AG |
| RE35,028 E | * | 8/1995 | Casebolt et al. | 119/857 |
| 5,445,114 A | * | 8/1995 | Walker | 119/857 |
| 5,544,846 A | * | 8/1996 | Stroud | 244/147 |
| 5,593,111 A | * | 1/1997 | Jackson et al. | 244/110 D |
| 5,890,225 A | * | 4/1999 | Marschall | 2/69 |
| 6,311,884 B1 | * | 11/2001 | Johnson | 224/627 |

(Continued)

FOREIGN PATENT DOCUMENTS

| | | |
|---|---|---|
| FR | 1226649 | 7/1960 |
| FR | 2256634 | 7/1975 |

OTHER PUBLICATIONS

French Search Report dated May 25, 2010 from corresponding FR0956737.

*Primary Examiner* — Tien Dinh
*Assistant Examiner* — Assres H Woldemaryam
(74) *Attorney, Agent, or Firm* — Young & Thompson

(57) ABSTRACT

A maintaining equipment with variable length side transverse strap segments in with the one side fastening strap, includes two pairs of saddle straps connected via saddle straps, to either the back transverse strap, back straps crossing the container backrest, or extension of the side transverse straps. The latter extends into a side fastening strap. A loop at a location locatable from the waist to the leg straps is run through by the side fastening strap or the side transverse strap. Strap tightening can occur at hooking or thereafter, allowing adjustment of the side transverse strap and the side fastening strap to maintain the container on the solo skydiver's back or maintain the passenger to the tandem pilot during freefall. Unlocking and/or loosening after canopy deployment elongates the side transverse strap with shortening of the side fastening strap allowing backward movement of the lower back and progression of the leg straps.

18 Claims, 12 Drawing Sheets

(56) References Cited

U.S. PATENT DOCUMENTS

| | | | |
|---|---|---|---|
| 6,367,582 B1* | 4/2002 | Derby | 182/3 |
| 6,644,597 B1* | 11/2003 | Bahniuk | 244/151 B |
| 6,685,135 B2* | 2/2004 | Geissler | 244/4 A |
| 6,824,106 B2* | 11/2004 | Douglas et al. | 244/151 R |
| D558,402 S * | 12/2007 | Petzl | D29/101.1 |
| 7,353,779 B2* | 4/2008 | Altieri | 119/770 |
| 7,938,302 B2* | 5/2011 | Gibson | 224/660 |
| 7,979,919 B2* | 7/2011 | Joran | 2/69 |
| 7,997,536 B2* | 8/2011 | Fradet | 244/151 R |
| 8,157,139 B2* | 4/2012 | Keeler | 224/654 |
| 2006/0254533 A1* | 11/2006 | Fuller et al. | 119/770 |
| 2008/0272238 A1* | 11/2008 | Fradet | 244/148 |
| 2010/0032526 A1* | 2/2010 | Higgins | 244/148 |
| 2010/0164258 A1* | 7/2010 | McHugh et al. | 297/195.11 |

* cited by examiner

HARNESS WITH ADJUSTABLE BACK STRAP

CROSS-REFERENCE TO RELATED APPLICATIONS

French patent application No. 0956737 filed on Sep. 29, 2009.

BACKGROUND OF THE INVENTION

After the deployment and till the landing, the skydiver or tandem passenger, supported by his harness, has a substantially upright position. However, this position, which is well adapted to the deployment phase, is not well adapted to the canopy descent and particularly to long duration flight. Indeed, the suspension of the body in upright position without any support does not promote the blood circulation and increases the drag, whereas a more seated position wherein the lower body is tilted to 90° toward the front with respect to the upper body, to get closer to an horizontal position of the thighs, thus not extending from the chest vertical direction, is more appropriate for the cardiovascular system, the comfort and the drift performance during canopy drift. Unfortunately, it is not possible to take without effort such a position with known harnesses and currently used strap fixation systems in skydiving because the strap and buckle arrangement makes such an important variation of the position during the canopy descent impossible.

BRIEF SUMMARY OF THE INVENTION

The object of the present invention is to overcome this disadvantage making a semi-automatic adjustment device enabling the skydiver to switch from an upright position adapted to undergo the opening shock, to a so-called seated position perfectly adapted to the canopy descent.

The device mainly focuses on the strap segments acting as back rest and which are called side transverse straps in the different embodiments of the invention.

The invention relates to the adjustment of side transverse and side fixation straps, carried out by means of an arrangement of flexible straps with a high mechanical strength and of adapted buckles.

Kinds of skydiving harnesses whose length of right and left segments of the side fastening strap can be pre-adjusted before the jump to conform to the morphology of different wearers by means of a sliding grip or mobile grip adjusting device and not modifiable during the canopy descent, are currently known.

The adjustments of these prior art devices, with a defined length during the jump, are difficult to make on solo parachutes, and generally need an adjusting time on the ground quite long to conform to the wearer's morphology. They are not satisfying in that the solo skydiver cannot make it alone when he has his harness on, and cannot modify it any more when he is in canopy descent, condemning the skydiver to keep the known upright position from deployment to landing.

From the prior art are also known devices where the length of the side fixation strap segments of solo harnesses is fixed so that it cannot even be adjusted on the ground. It is definitely determined at the time of manufacture according to a wearer's morphology to maintain the container on the back and restricts the backward movement of the skydiver's lower part of the back.

As for the tandem passengers' harnesses, the forward move of the leg straps, during the canopy descent, cannot be done without proceeding to complex operations of modification of the strap adjustment done on the ground.

The invention aims at enabling and simplifying the harness adjustment and restraint on the skydiver's body, regardless of the wearer's morphology.

The invention also aims at allowing the harness wearer to have a transverse translation movement of the lower limbs, thus meaning: any continuous or discontinuous straight movement in a direction substantially perpendicular to the vertical of the user, the latter being upright.

That is to say providing an equipment provided with means allowing the user during the canopy descent to switch from the upright position to the seated position in flight, either by the possible backward movement of the lower part of the back if he is alone, or by the possible move forward of the leg straps in the case of a jump as a tandem passenger, thanks to a unlocking or loosening operation carried out after the parachute deployment, either by the solo skydiver or the tandem pilot when a tandem passenger's harness is involved.

The present invention relates to a strap arrangement for a harness intended to enhance the posture and the safety as well as the comfort during the canopy descent, it relates to a set of straps with variable length which divides on the right side and on the left side of the user into two segments, one of which constitutes a back rest, and the other segment a side fastening.

The internal segment is called the side transverse strap and the other strap segment, dedicated to side fastening, is called external segment, they can also be sub-divided into segments on the right side and on the left side of the user.

The device according to the invention is also provided with a pair of leg straps as known in prior art and includes, according to another aspect of the invention, at least two support and security straps constituting saddle straps which are associated by one of their ends either to the segment of the back transverse strap or to one of both back straps and by the other end to one of both leg straps.

In all embodiments of the device according to the invention, it can be noticed that the strap arrangement constitutes a secured seat of the type: the harness is <<a closed circuit>> regardless of the state of the adjustment devices, thanks to the configuration of the saddle straps preventing any fall of the body between the leg straps and the back transverse strap, even where one forgot to engage the link element of the waist belt when a solo skydiver is involved, or locking elements of the side fastening straps when the tandem passenger is involved.

The preferred embodiment of the invention when intended for a solo skydiver is characterized in that it includes a waist belt having a retaining buckle in two parts, provided with a quick locking/unlocking connecting device, of the push-button type and provided with adjustment means of double keeper type to ensure a progressive means to tighten and bring toward each other right and left segments of the side transverse strap and of the side fastening strap.

It can be understood that contrary to prior art devices, the simultaneous adjustment of the side transverse strap and side fastening strap sizes of a solo skydiver's harness having such a waist belt, is done after locking the retaining buckle fixed on the front face, that is in front of the wearer and no more to the free ends of the harness side fixation straps.

This device then enables by its simple unlocking or loosening to obtain a simultaneous spacing apart of both right and left segments of the side transverse strap and of the side fastening strap, a configuration coupled to the extension of the side transverse strap segment with respect to the side fastening strap segment.

A loop preferentially mounted on metal articulation rings runs through this arrangement of secondary straps, connected to the main straps or to the leg straps, and needs a quick self-tightening locking and unlocking device mounted on the waist belt when the device according to the invention is provided on a harness for solo skydiver.

This enhancement thus provides the advantage of allowing and facilitating the harness adjustment autonomously as well as an additional comfort during canopy descent, for the wearer who can relax his back, an his gluteus and abdominal muscles, while remaining firmly retained by the harness straps.

This result is achieved by a removable arrangement of the side transverse strap and of the right and left side fastening strap, so that the harness judiciously uses the human body shapes.

The wearer is thus self-balanced thanks to a particular path of the straps which results for these from a uniform tensioning equally distributing the embracing effect of the user at specific points of its anatomy: thighs, kidneys, waist and back, the particular feature of this invention being the variable geometry of the straps enabling the user to seat in the harness which retains him during the configuration of canopy descent following deployment.

On the other hand, as previously described, the invention is not limited to the only embodiment intended for the solo skydiver, there is another embodiment of the invention consisting in providing a maintaining and comfort device for tandem passengers so that the aim is the same: the side fastening strap ensures the support function and its extension into a side transverse strap enables the variation of the length according to the position of the user's back in order to ensure the comfort on the ground, in free-fall and during the canopy descent.

The whole interest of the device according to the invention can be easily seen as it enables the switch from a first upright position to a second seated position with only one additional operation to be done consisting in releasing the waist belt or the side fixation strap for the solo skydiver, whereas there is no additional operation to be done for the wearer of the tandem passenger's harness, the transmission of the passenger loosening being automatically done in a known manner by the tandem pilot according to the conventional procedure carried out in the canopy descent.

The harness according to the invention, which ensures the tandem passenger's comfort and safety, is characterized in that the length variation of the side transverse strap segments is done by unhooking the side fastening straps attached on the right side and on the left side of the user, the hooking being done in a known manner by means of a snap ring disposed on each side of the side fastening straps, and associated to a ring disposed either on the back container or on the load bag of the tandem pilot's harness when the latter is placed at the back.

This goal is achieved by arranging segments of the side transverse strap so that they are brought in contact and made to conform to the lower back outlines with means such as a limiting buckle to restrain in the pulling direction, the length pre-adjusted on the ground of the side transverse strap segments in order not to compress the passenger's body, during the tightening made by the tandem pilot.

Thus the tightening operated by the tandem pilot functions by decreasing the length of the side fastening and side transverse straps disposed between the tensioning-limiting buckle and the snap ring, in order to ensure the passenger's posture and lateral stability during free-fall.

The pre-adjusting configuration of the side transverse strap length on the ground, and the tightening of the side fastening straps and of the side transverse straps by the tandem pilot allowing to obtain both comfort and stability perfectly adapted to the free-fall part are already known in the prior art on the tandem passengers' harnesses, whereas the particular feature of the invention is in the unlocking functionality which allows the passenger at the necessary time during the canopy descent, to assume a seated position which ensures the tandem passenger's comfort and is perfectly adapted to the tandem pilot's operations.

To assume this seated position, the usual operation after the tandem parachute deployment is enough. It consists in releasing the snap rings out of their ring and/or in extending the length of the side fastening straps. The reason why the result differs with the device according to the invention is that it enables to extend the side transverse strap of tandem passenger allowing, under the effect of the wearer's weight, the forward movement of the leg straps and their passage under the wearer's thighs, allowing their raise and thus their move closer to an horizontal position.

This side transverse strap extension done under canopy, made possible by the device according to the invention in an embodiment intended for the tandem passenger's harness, will be thereafter described in detail.

To obtain the best support of the tandem passenger in free-fall, the lateral stability is conventionally obtained by the tandem pilot tightening of the tensioning means located on the right and left side fastening straps of the passenger's harness, as known in the prior art.

Depending on the embodiment of the device according to the invention, this latter shows an additional advantage of lateral support, thanks to its tightening mode which differs from the known devices because in one of the embodiments of the invention, the side fastening straps which maintain the tandem passenger against the tandem pilot during free-fall, are connected at the top of the leg straps thanks to the loop fixed thereto.

This last configuration enables to limit the movement of the passenger's lower limbs under his own body, and thus to limit the instabilities during the free-fall period.

Then, after the parachute deployment, since the tandem passenger's support in free-fall becomes useless, its releasing is obtained by the lateral disconnection between the passenger and the tandem pilot which is conventionally done by unlocking the snap rings out of their retaining ring disposed on the right and left sides on the tandem pilot's harness, and/or by progressively loosening their tightening means.

This last action carried out with the device according to the invention allows the side fastening straps to slide in the slot of each loop, this sliding can be carried out until the snap rings abut the loops.

It can be noticed that if the tandem pilot forgets to hook the side fastening straps of the passenger's harness, this passenger is retained by the saddle straps in the same way as in the embodiment of the device according to the invention for the solo passenger.

Therefore, the particular feature of this device which is to enable, after loosening, the extension of the length of the side transverse strap segments of the passenger's harness, generates by limiting the backward movement of the tandem passenger's lower part of the back caused by the physical presence of the tandem pilot, the forward movement in translation of the leg straps compared to the transverse back strap and then the forward movement of the thighs toward the horizontal plan.

This last embodiment of the device according to the invention, thus consists in that the side transverse strap is the extension of the side fastening strap on right and left sides, with the characteristic of being removable till a stop, thanks to a manual action of unhooking to be done under canopy by the tandem pilot, which action is identical to the one conventionally done on any tandem passenger's prior art harness.

The harness for solo skydiver according to the invention is characterized by the addition of a waist belt associated on right and left sides, to both above-mentioned segments of length variable straps relative to one another: a segment external to a loop called side fastening strap and a segment internal to said loop, called side transverse strap, wherein all segments of side fastening and side transverse straps form a circular closed loop.

The device is designed to modify, thanks to an associated tightening means, the circumferential adjustment adapted to the user's waist circumference and to modify at will the spacing apart of the right and left segments, with respect to each other, and also to change the length of the right and left inner segments by modifying the one of the right and left outer segments by the hooking and/or tightening means which controls either the unlocking and/or the adjustment, the latter being preferably disposed on the waist belt.

The device is in particular characterized in that each external segment which acts as a side fastening strap slides in the slot of a preferably metal loop in a region where is also fixedly connected one end of the harness main strap, and one end of the leg straps.

In an alternative embodiment of the invention more particularly dedicated to the tandem passenger's harness, the loop cannot be connected to the main strap but is disposed in a different way, as for instance only on leg straps.

The metal loop dedicated to allow the passage of the side transverse strap and side fastening strap can be associated to a connecting ring.

An implementation intended for the solo skydiver is provided with right and left segments of substantially the same length, the waist belt is connected to one of the segments, e.g. the right one, thanks to a sliding loop acting as a tensioning means, constituting by its presence, the delimitation of the internal and external segments on the right side.

The hooking means of this waist belt is provided by a buckle which has two removable portions forming each a half buckle, with a closing device and an adjustment device for the first one and a complementary strap closing and passage device for the second one.

One of the closing half buckles is provided with a loop for the strap passage of one of the segments and a keeper, the half buckle passes free to move in one of both segments, e.g. the left one, forming by its presence the delimitation between internal segment and external segment on the left side, i.e. side transverse strap and side fastening strap.

The other half buckle is connected to the waist belt, it consists of a double loop to enable the waist belt to freely pass back and forth, thus forming an adjusting device to enable to tighten and to loosen the waist belt, said double loop being coupled to a link element such as a bolt intended to receive the keeper of the other half buckle.

In this configuration of strap arrangement, it can be noticed that the lengths of the right and left segments can also be different, i.e. the right segments, for example, can receive the additional length of the waist belt and thus form a buckle shorter than the left segments which directly receive the passage of the half buckle with the keeper, without changing the invention in any way.

The waist belt end is intended to tighten in order to enable the right and left segments of the side transverse strap and of side fastening straps to close up toward one another and to enable to maintain this position during the free-fall phase.

Tightening, loosening and separating of the waist belt can be carried out with only one hand from the preferred side.

Tightening enables to adjust at will the harness support on the wearer's back depending on his/her morphology, the manual pull carried out while tightening producing the simultaneous decrease of the mutual spacing of both right and left segments of the side transverse strap and of both right and left segments of the side fastening strap, operation achieved along with the decrease of the distance between the retaining buckle and the loop located on the right segments.

This gradual movement of spacing decrease of the right and left strap segments while adjusting the waist belt is achieved by sliding the left segment of the side fastening strap in its loop and accompanying the left segment of transverse back strap while tightening the belt when the waist belt is placed on the wearer's right.

This movement also causes the right and left segments to close up while simultaneously reducing the length of the waist belt between the loop and the retaining buckle located on the wearer's right.

The setting system according to the present invention allows to adjust the waist belt to the intended size, since the action results in the reduction of the mutual spacing of the segments.

The skydiver can, regardless of its position, during the canopy descent, loosen the waist belt which progressively slides in the opposite direction.

This same self-tightening closing and adjustment device is also instantaneously removable by simply actuating the quick release buckle so that its separation intervenes by hand by the action of the wearer during the canopy descent and causes by simultaneous spacing, the removal of the left segments of the side transverse strap and of the side fastening strap compared to their respective right segments.

As a result, under the wearer's weight, the length of the side transverse strap increases, allowing a rearward ease of movement in order for the user to be able to move backward its lower part of the back by resting on the saddle straps.

Of course, the mounting of the retaining half buckles in the right and left segments can be reversed, so that a half buckle with window and keeper which freely runs on the right segments of side transverse and side fixation straps can be provided, whereas the left segments of side transverse and side fixation straps can receive, connected to a loop, a waist belt with a double loop coupled to a bolt as a link element.

Similarly, it is also possible to mix on right or left sides the configuration of the bolt, the keeper and the double loop of half buckles without changing the invention whatsoever.

Saddle straps which link either the back transverse strap, or the back straps to the leg straps are disposed to ensure a comfortable seating in order to enable the backward movement of the lower part of the back during the canopy descent, and to ensure that the skydiver will not fall from the harness backwards, particularly if he forgets to close the waist belt, or if he prematurely accidentally opens the waist belt. We notice that these saddle straps can anchor on the back straps which extend from the shoulder straps by going through the container backrest.

Therefore this strap arrangement combined with the configuration of the saddle straps capturing the leg straps either at the back transverse strap or at the back straps is particularly adapted because it can always be used with enough safety, even if the wearer forgets to engage the closing element.

Thus, apart from the safety relating to the resistance which remains unchanged, this particular conception of the circuit of these straps gives the user an ease of movements, obtained by the self-balancing while tightening the side transverse strap segments which conform to the outline of the user's back.

This configuration adjustable in length enables to maintain the harness in position during free-fall, while ensuring during its detachment by a simple unlocking pressure of the user, an extension allowing a gain in comfort and a drag decrease, obtained by the backward movement of the lower part of the back to obtain the seated position.

The configuration of the right and left segments of the side transverse strap and of the right and left segments of the side fastening strap is such that it can be a single loop-shaped strap mounted in a backward and forward position.

Thanks to the adjustment system of the invention, the solo user can adjust alone the harness length after equipping himself: after having pulled on the parachute and put both legs in the leg straps, he assembles both half buckles and adjusts the waist belt by pulling or releasing, the tightening causing the right and left segments to close up.

The left segment of the side fastening strap and the left segment of the side transverse strap both close up together to their respective rights segments, as the length of the waist belt between the loop located on the right side and the retaining buckle decreases.

The simplicity of use for the solo skydiver becomes obvious and allows the user to precisely adjust his harness on the ground, once equipped with the parachute on his back, alone and with no other prior and additional intervention.

The loosening is achieved by releasing the end of the waist belt in the double loop by sliding in the opposite direction of the waist belt and its detachment is achieved by simply pressing the closing mechanism of the retaining buckle, releasing both half buckles.

The function of the device previously described enables either to entirely release the waist belt, or to loosen it at will.

These actions enable the sliding, reducing the length of the left fastening strap segment in its loop simultaneously with the extension of the left segment dedicated to the side transverse strap, while on the right side the backward movement is achieved particularly by the side transverse strap segment sliding, the length of which increases at the expense of the length of the right fastening strap segment which decreases.

The length increase of the right and left transverse straps enables the backward movement of the lower part of the back up to the abutment of the strap segments in the slot of the right and left loops.

The present invention thus relates to a skydiving harness, adapted to cooperate with a bag, comprising:
  first and second main straps, positioned in use respectively on both sides of the user's chest, each main strap extending at one end into a shoulder strap, and then into a back strap, the ends of both back straps being connected to a back transverse strap;
  first and second leg straps, the free end of each first and second main straps being connected to a fastening point, respectively of the first and second leg straps;
wherein the harness further includes:
  first and second side transverse straps, connected at one end to the back transverse strap, and extending respectively into first and second side fastening straps which are connected or adapted to be connected to a lower part of the bag or to a load or load envelope fixed to the lower part of the bag, each side transverse strap or each side fastening strap being adapted to slide in a loop, which is integral with the associated main strap and/or the associated leg strap, and each side transverse strap and/or its associated side fastening strap having a tensioning means of the side fastening strap and of the associated side transverse strap, the tensioning means being coupled to a hooking means adapted to cooperate with a complementary hooking means constituted by the hooking means carried by the other side transverse strap and/or its associated side fastening strap or of a hooking means carried by the bag; and
  saddle straps extending between the back transverse strap or the back straps and each one of the leg straps,
wherein the harness is switchable from a first position in which the harness is maintained tight on the user's body without the user resting on the saddle straps by hooking each hooking means to its complementary hooking means and tightening of the tightening and loosening means, to a second position in which the user rests on the saddle straps, the second position being achieved after the canopy deployment by unhooking the hooking means or, each hooking means being kept hooked to its complementary means, gradually loosening the tightening and loosening means. Preferably, the harness is switchable from a first position in which the harness is kept tightened on the user's body without the user resting on the saddle straps by hooking each hooking means to its complementary hooking means, to a second position, in which the user rests on the saddle straps, the second position being obtained after the canopy deployment by unhooking the hooking means.

According to a particular feature of the invention, the harness further includes tightening and loosening means of the side transverse straps and of the associated side fastening straps, allowing, each hooking means being maintained hooked to its complementary means, to switch from the first position of the harness to the second position of the harness, gradually by loosening the tightening and loosening means.

According to a first embodiment of the harness of the invention cooperating with a bag to form a parachute pack of an individual skydiver or a tandem pilot skydiver, each side fastening strap of the harness can be sewn by its end to the lower part of the parachute pack, and each tensioning means can be directly carried by and delineate the junction between the side transverse strap and the side fastening strap, the side fastening straps and the side transverse straps being tensioned by hooking, on the user's stomach, the hooking means coupled to the tensioning means.

According to a particular feature of the invention, the harness further includes a waist belt member, carrying at one end a loop constituting the tensioning means, adapted to slide on a side transverse strap and its associated side fastening strap, the waist belt member also carrying a link element which constitutes the hooking means and which is provided with a member cooperating with the waist belt member to allow the link element fixation on the waist belt member, and the complementary tensioning means consists of a loop, adapted to slide on the other side transverse strap and the associated side fastening strap, a keeper, mounted on the loop and constituting the complementary hooking means, being adapted to receive the link element by locking to tension the side transverse straps and their associated side fastening straps.

The member cooperating with the waist belt member can be of double loop type, allowing the adjustment of the hooking means position on the waist belt member and constituting the tightening and loosening means of the side transverse straps and of the associated side fastening straps, its loosening allowing the passage of the harness from the first position to the second position when the hooking means and its complementary means are attached.

According to a second embodiment of the harness of the invention cooperating with a bag to form a parachute pack of an individual skydiver or of a pilot or tandem skydiver, each side fastening strap can be adapted to be removably connected to the lower part of the bag and the tensioning means of the side transverse straps and of the side fastening straps can be carried by both fastening straps and are coupled to the hooking means respectively in order for the hooking means to cooperate with complementary hooking means carried by the lower part of the bag, the connection of the hooking means to the complementary hooking means on the lower part of the bag allowing the tensioning of the side transverse straps and of the side fastening straps.

Each tensioning means carried by a side fastening strap can consist of a member cooperating with the side fastening strap to allow the tensioning of the corresponding side fastening straps and side transverse straps, and by a snap ring constituting the hooking means and coupled to said member cooperating with the side fastening strap, and the complementary hooking means carried by the lower part of the bag can consist of a ring on which the snap ring locks to tension the corresponding side fastening straps and side transverse straps.

The member cooperating with the side fastening strap can be of the double loop type, allowing the position adjustment of the tensioning means on the corresponding side fastening strap and constituting the tightening and loosening means of the side transverse straps and of the associated side fastening straps, its loosening allowing the passage of the harness from the first position to the second position when the hooking means and its complementary means are attached.

According to a third embodiment of the harness of the invention intended to constitute the passenger's harness of a tandem harness provided with a pilot parachute pack and a passenger harness, the main straps of the passenger's harness can carry fixation means cooperating with complementary means carried by the main straps of a pilot parachute pack, and the tensioning means of the side transverse straps and of the side fastening straps can be carried by both side fastening straps and are coupled to the hooking means respectively in order for the hooking means to cooperate with complementary hooking means carried by the lower part of the bag, the connection of the hooking means to the complementary hooking means on the lower part of the bag allowing to tension the side transverse straps and the side fastening straps.

Each tensioning means carried by a side fastening strap can consist of a member cooperating with the side fastening strap to allow the tensioning of the corresponding side fastening straps and side transverse straps, and of a snap ring coupled to said member cooperating with the side fastening strap, and the complementary hooking means carried by the lower part of the bag can consist of a ring on which the snap ring is locked to tension the corresponding side fastening straps and side transverse straps.

The member cooperating with the side fastening strap can be of double loop type, allowing the position setting of the tensioning means on the corresponding side fastening strap and constituting the tightening and loosening means of the side transverse straps and of the associated side fastening straps, its loosening allowing the passage of the harness from the first position to the second position when the hooking means and its complementary means are attached.

Two loops can be sewn on the back transverse strap, each side transverse strap sliding through one of the loops and extending after the respective loop into one of both saddle straps to obtain a configuration with crossed and non crossed saddle straps, wherein the side transverse straps and the saddle straps are connected to the back transverse strap by the loops.

The saddle straps and the side transverse straps can be sewn on the transverse back strap.

The loop into which each side fastening strap and its associated side transverse strap slide can be carried by the associated leg strap.

The loop into which each side fastening strap and/or its associated side transverse strap slide can be carried by a connection area between the main strap and the associated leg strap.

Limiting buckles for tensioning the side fastening straps and the side transverse straps can be sewn, on the side transverse straps, in order to limit the tensioning when the hooking means are operated for tensioning the side transverse straps and the side fastening straps.

The saddle straps can be elastic.

The saddle straps can be assembled by a textile material piece, particularly by a wrinkled fabric piece, wrinkled in a particular by the elasticity of the saddle straps, to keep the saddle straps into retracted position until the user is in the second position.

The invention also relates to a tandem harness, characterized in that it includes a passenger harness as defined above in combination with a pilot parachute pack as defined above.

BRIEF DESCRIPTION OF THE SEVERAL VIEWS OF THE DRAWING

Other advantages and features will become apparent from the following description of several non-limiting and exemplary embodiments of the invention, represented in the accompanying drawings, wherein.

DETAILED DESCRIPTION OF THE INVENTION

Positioning and adjustment of the waist belt in FIGS. 1, 2, 2A and 4

Figure 1:
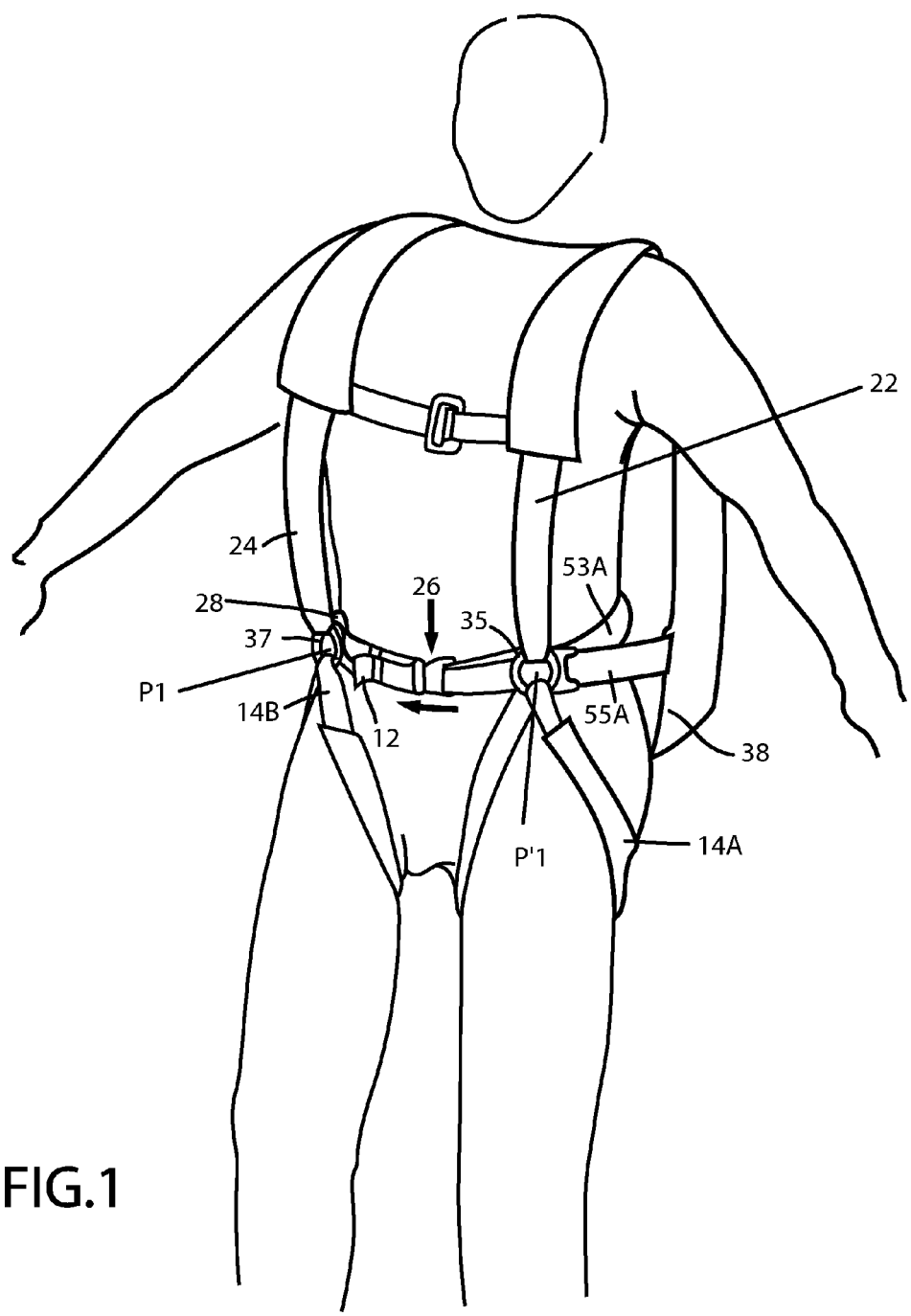
FIG. 1 is a ¾ front perspective view of the skydiver in the first position, equipped with the device in a closed position.

In FIG. 1, the skydiver is equipped with a harness adapted to the invention which also carries the reserve parachute and the main parachute wrapped in a back container 38.

The skydiver provided with a harness according to the invention is in a so called vertical first position, the support of his harness on the back is adapted to the free-fall operations and to the deployment phase, the waist belt 12 is adjustable after locking by the tightening means.

The locking element consists of a retaining buckle 26 which is made up of half buckles 25 and 27 assembled together and which can be detached as required, and the tightening means is associated to the half buckle 25.

The loop located on each side of the represented harness is associated to a C-shaped connecting ring 35,37 dedicated to the sliding of the side fastening strap segments 55A and 55B and of the side transverse strap segments 53A and 53B.

These lengths of strap segments as shown in FIG. 1 are disposed into a closed loop and are integral with one another when the locking element 26 is closed.

The leg straps 14A and 14B are firmly fixed by one end to their respective connecting ring equipped with the loop 35, 37.

In FIG. 1, the lower ends of the left and right main straps 22, 24 are fixed to a fastening point (P1, P1') by their respective connecting ring equipped with the loop 35,37.

The retaining half buckle 27 is adapted to freely move on the left segments of the side transverse strap 53A and of the side fastening strap 55A, before the complete tightening of the waist belt 12.

The length of the waist belt 12 is adjustable only after assembly of the link element represented by the bolt 40 carried by the double loop coupled to the member 25, with the keeper 41 of the other half buckle 27 forming the retaining buckle 26.

The side transverse strap segments 53A, 53B are moved closer and adjusted by self-tightening of the waist belt 12.

The waist belt 12 is tightened depending on the user's size to obtain an adjustment adapted to the user's size, so that the side transverse strap segments 53A and 53B conform to the body shape between the retaining buckle 26 and the wearer's back.

The adjustment obtained remains unchanged during the whole free-fall phase by automatically blocking the retaining buckle 26, until a manual intervention loosens or suppresses the supporting effort exerted by the retaining buckle 26.

Releasing the retaining buckle 26 is achieved by the manual separation of the bolt 40 and of the keeper 41.

After having pulled on the leg straps 14A and 14B and put the parachute on the back as a jacket or a harness, the user positions the waist belt 12 by engaging the bolt 40 coupled to the double loop belonging to the member 25 in the keeper 41 of the half buckle 27, and pulls, with one hand, the end of the waist belt 12 in the direction of the arrow shown in FIG. 1.

This configuration enables to jointly exert an adjustment of the side transverse strap segments 53A and 53B around one's body, for more comfort while providing a tension of the side fastening straps 55A and 55B ensuring the support of the back container 38 on the wearer's back.

A consequence is that the gradual movement of tightening of the length of the waist belt 12 between the tensioning means represented by the loop 28 and the retaining buckle 26 is associated to the fact that the left segments of side transverse strap 53A and of side fastening strap 55A simultaneously get closer to their respective opposed segments 53B and 55B.

The retaining buckle 26 blocks the waist belt 12 in the desired tightening position.

In FIG. 1, the adjustment of the waist belt 12 is complete, and the user can jump because the support of the back container 38 on the skydiver's back is ensured during free-fall thanks to the joint and simultaneous tightening of the side transverse strap segments 53A, 53B and of the side fastening strap segments 55A and 55B.

Figure 2:
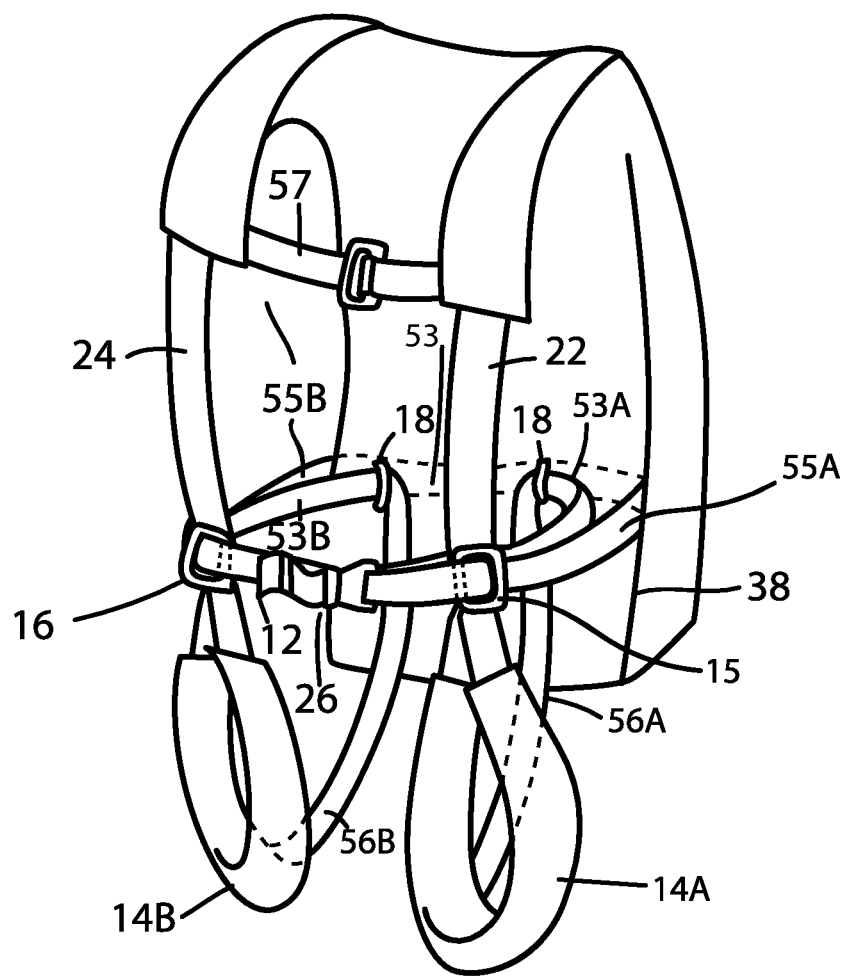
FIG. 2 is a view of the device alone, in a closed position in a different embodiment.

FIG. 2 represents the harness with all the straps represented, necessary to the device functionality according to the invention.

In the absence of connecting rings provided with the loop 35,37, the ends of leg straps 14A and 14B are fixed in the extension of the lower end of the main straps 22,24.

The loop which ensures the sliding of the strap segments consists of the rectangular rings 15 and 16 disposed at the periphery of the main straps 22,24, instead of the connecting rings provided with the loop 35,37.

The positioning of the chest strap 57 is not related to the device according to the invention.

The side transverse strap segments 53A, 53B extend without interruption between the buckle 26 and the loop 18 intended to link them to the back transverse strap 53 and to delineate them from the saddle straps 56A, 56B whereas the side fastening strap segments 55A, 55B extend between the buckle 26 and the container 38 after a passage in the loops 15 and 16. Both right and left segments of side fastening straps 55A, 55B are connected to the periphery of the back container 38 but could be attached further inside the container.

As shown on the drawing of FIG. 2, both saddle straps 56A and 56B are connected by one end to the leg straps 14A and 14B and become by extension of the other end, the side transverse strap segments 53A and 53B after their passage for each one in a loop 18 allowing a change in angle of 90° in its path, but in another embodiment of the invention they can link the leg straps 14A and 14B to the back straps, through the backrest of the container 38.

Figure 4:
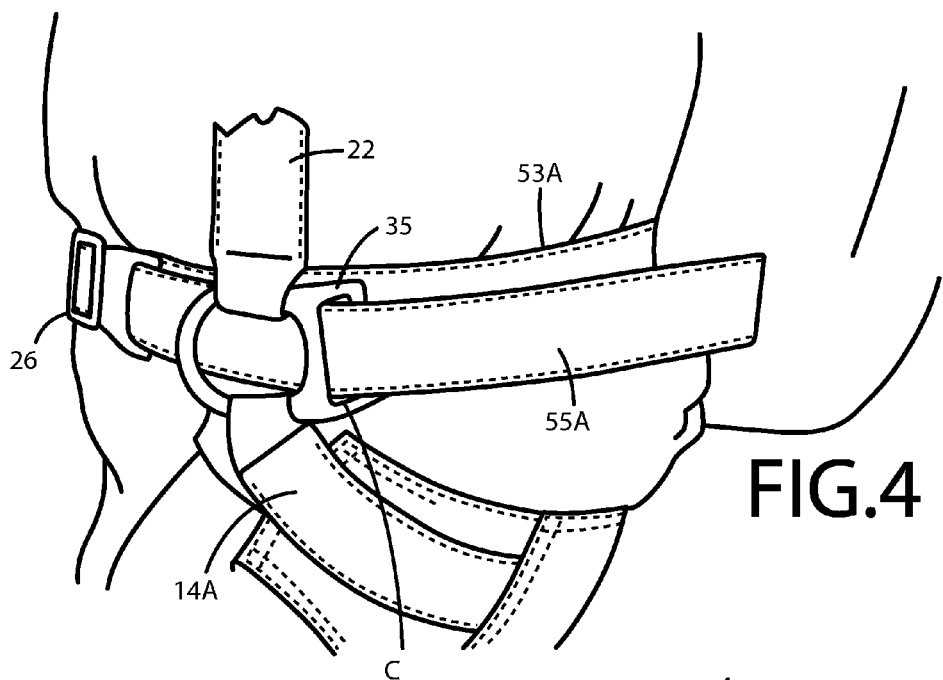
FIG. 4 is a partially detailed view of the device, showing the path of the straps when the device is in a closed position.

The tensile stress exerted by the waist belt 12 and shown in FIG. 4, uniformly shares out on each side of the user and remains maintained as long as the locking of the buckle 26 is done or as long as the waist belt 12 will not have been manually loosened.

Figure 2A:
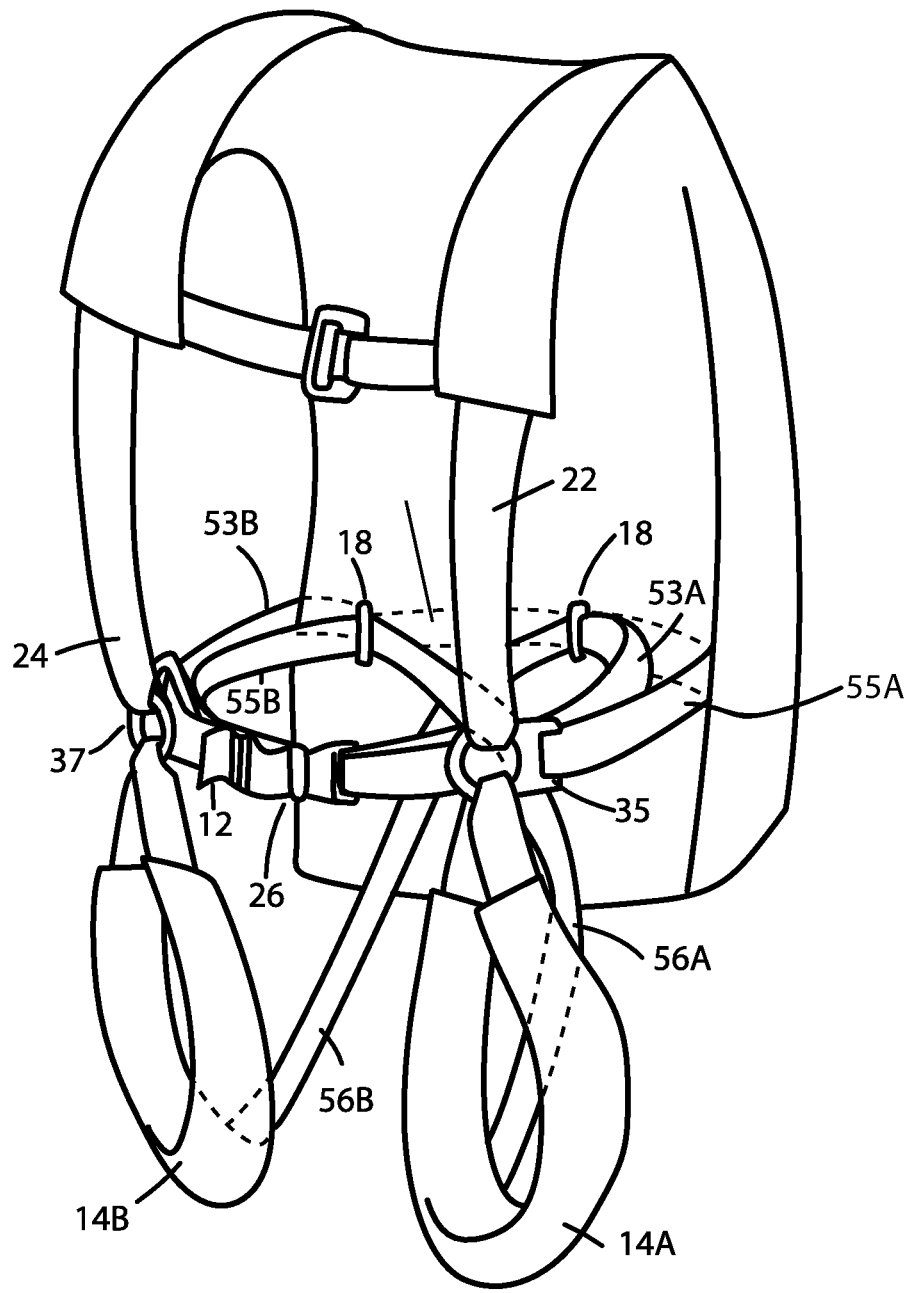
FIG. 2A is a view of the device alone, in a closed position in another embodiment.

In FIG. 2A is shown the embodiment of the invention wherein the saddle straps 56A, 56B are crossed and their ends which are not connected to the leg straps become by extension the segments of the opposed side transverse strap 53B, 53A after their passage in the loop 18.

Thus in the embodiments shown in FIGS. 2 and 2A, when the user tightens the waist belt 12, he/she simultaneously tightens the excess of saddle straps 56A, 56B.

During the canopy descent, the unlocking of the waist belt 12 enables the loosening of the saddle straps 56A, 56B and the possibility to seat for the user.

Figure 3:
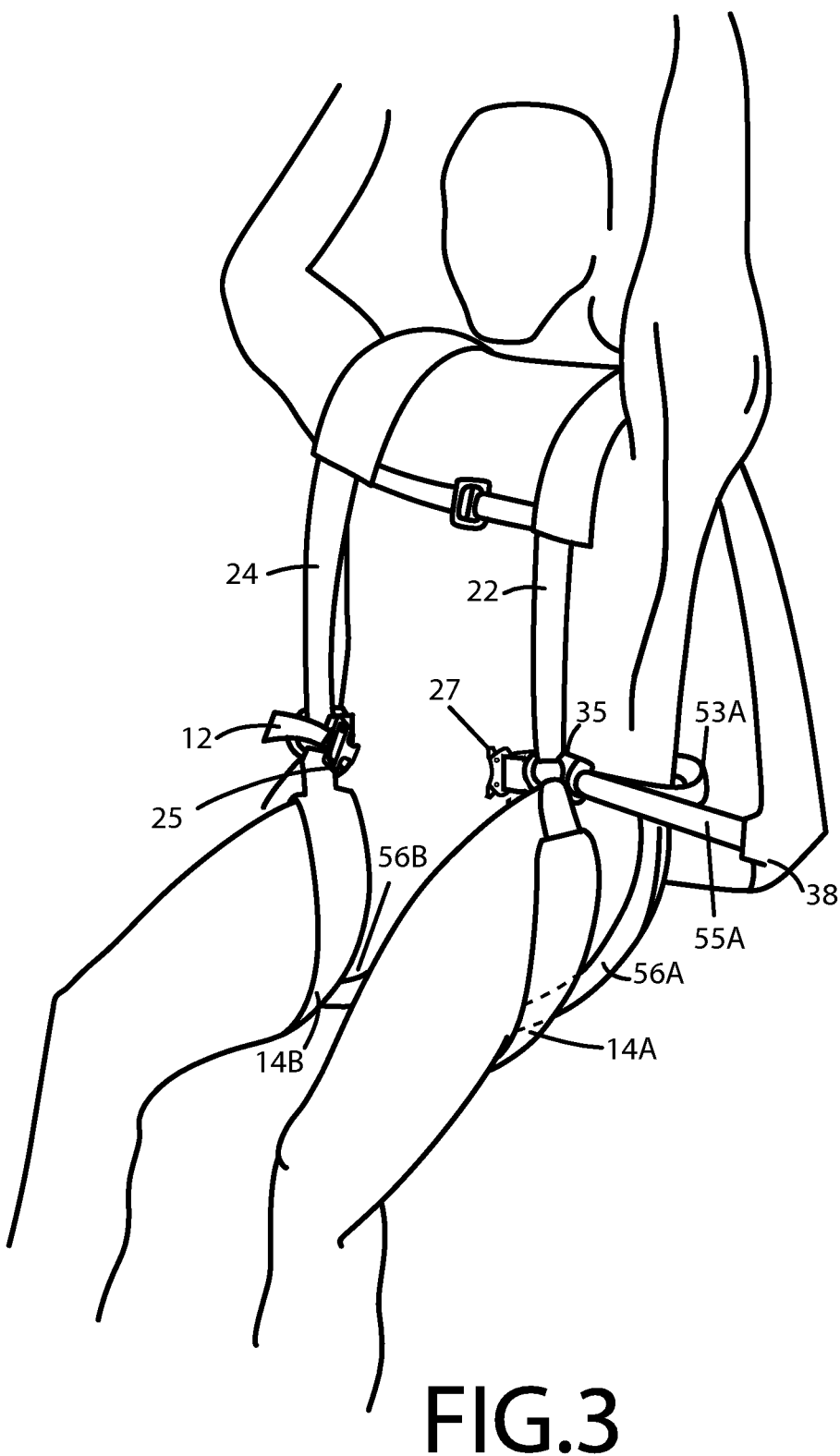
FIG. 3 is a view of the skydiver in the second position during the canopy descent, equipped with the device according to the invention in an open position.
Figure 5:
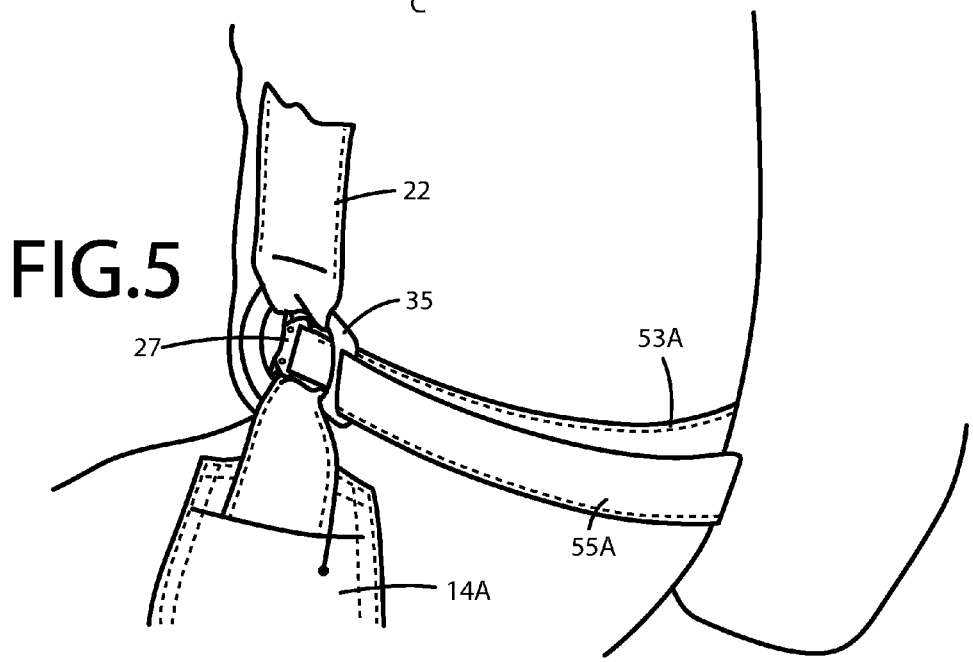
FIG. 5 is the same detailed view as FIG. 4, with the device in an open position.
Figure 6:
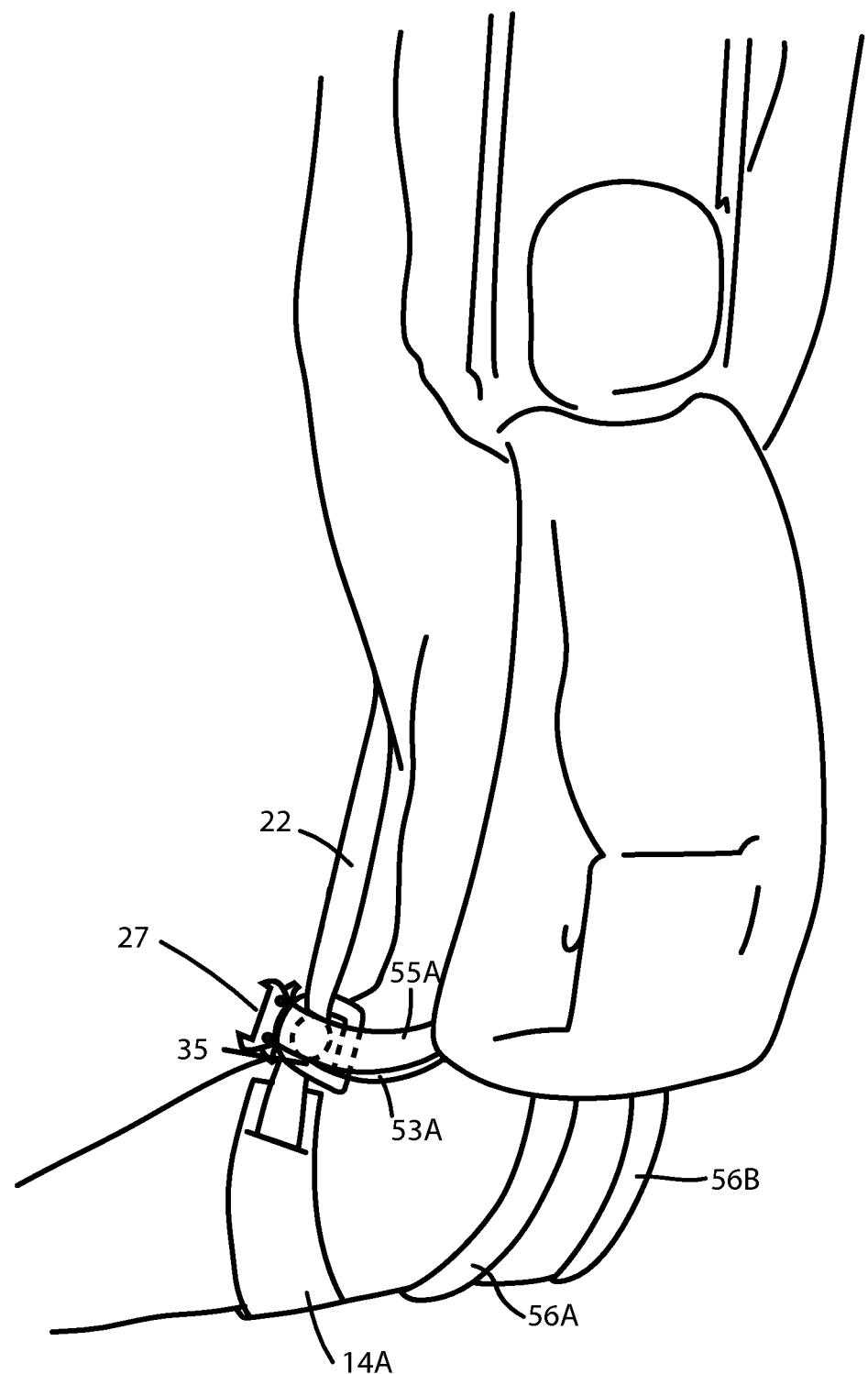
FIG. 6 is a ¾ rear view of the skydiver during the canopy descent, equipped with a different embodiment of the device in an open position.

Loosening or Removing the Waist Belt (FIGS. 3, 5 and 6).

Once the canopy descent is initiated, the simple manual unlocking of the retaining buckle 26 allows the wearer to take place in a seated position as shown in FIG. 3.

All he/she has to do is to operate simultaneously with only one hand the push-buttons BP of the retaining buckle 26, releasing the bolt 40 and the keeper 41.

The blocking effect of both right and left segments of the side transverse straps 53A, 53B and both right and left segments of the side fastening straps 55A, 55B disappears by unlocking the waist belt 12, and the simultaneous spacing from each other of the right and left segments of side transverse straps 53A, 53B and of side fastening straps 55A, 55B allows the backward movement of the lower part of the back.

The unlocking effect of the waist belt 12 appears, in FIG. 5 where are represented in detail the segments of side transverse strap 53A and of side fastening straps 55A unlocked on the user's left side, the half buckle 27 abuts the slot C of the loop of the connecting ring 35, preventing each segment of side transverse strap 53A and of side fastening strap 55A from extending, the course being at the maximum of its possibilities.

Still in this FIG. 5, it is possible to precisely distinguish the passage of the side fastening strap 55A in the slot C of the loop and the separation from the side transverse strap 53A, as well as the delimitation between the segment of side transverse strap 53A and of side fastening strap 55A represented by the half buckle 27.

The locking of both straps is materialized by this schematic drawing of closed loop around the loop of the connecting ring 35, and which constitutes the path of the segments of side transverse strap 53A and side fastening strap 55A both connected to the back container 38.

Another alternative allowing the same ultimate purpose but more gradually, is to manually loosen the end of the waist belt 12.

The wearer can use only one of his/her hands to do so and he/she is not restrained by the retaining buckle 26, because of the flexibility of the waist belt 12 which acts as a belt and which can be gradually released in the direction opposite to the arrow shown in FIG. 1, the disposition of the straps being such that their sliding is then possible until the waist belt 12 is entirely removed from the double loop coupled to the member 25 or until an abutment is obtained, when a strap return at the end of the waist belt 12 exists.

The loop coupled to the member 25 of multiple strap passage type, is removably accommodated in the half buckle 27 which has a keeper 41 and is provided with a clasp which preferably has the aspect of a push-button BP intended to gather and release the bolt 40, this action thus enabling to instantaneously modify the spacing of the segments of side transverse strap 53A, 53B and of side fastening strap 55A, 55B.

The double loop coupled to the member 25 acts as an adjusting device allowing the adjustment to shorten or extend the waist belt 12 on one side, thereby causing the segments of side transverse strap 53A and side fastening strap 55A, and the segments of side transverse strap 53B and side fastening strap 55B to move towards or away from each other.

Push-buttons BP enable the unlocking of the waist belt 12.

FIG. 3 shows the solo skydiver equipped with the device according to the invention in its so called seated position, the gluteus moved backwards, so that the comfort is enhanced and the drag is reduced.

To reach this position, the user had to unlock the retaining buckle 26. It is possible to understand better the importance of the retaining device according to the invention represented in this embodiment which consists of at least two saddle straps 56A, 56B each of which has one end connected to the back transverse strap 53 located down the back container 38 on the one hand, and the other end of the saddle strap 56A, 56B connected to the leg strap 14A, 14B on the other hand.

It is to be noted that when both saddle straps 56A, 56B are crossed, this does not change the essence of the invention at all.

The presence of these two saddle straps 56A, 56B constitutes a retaining assembly in the unlikely case where the user would not have connected its waist belt 12 before the deployment, and constitutes a seat acting as a support during the backward movement of the lower part of the back allowed after disconnecting or releasing the waist belt 12, during the canopy descent.

It is to be noted that these saddle straps 56A, 56B can be anchored on the back straps not represented, at the height of the wall separating the reserve container and the main container by going through the backrest of the container 38, and/or can be connected to each other by a fabric piece.

It is also to be noted that the saddle straps 56A, 56B can be tubular straps incorporating therein an elastic, of the fall preventing elastic longe type made up of an energy-absorbing material.

In FIG. 6, the segments of side transverse strap 53A and side fastening strap 55A can both pass over the main straps 22, 24 in an overlapped way.

In this same Figure, only the side transverse strap 53A passes inside the slot C of the loop and then over the associated connecting ring 35 and the side fastening strap 55A passes over the side transverse strap 53A and the connecting ring 35.

Figure 7:
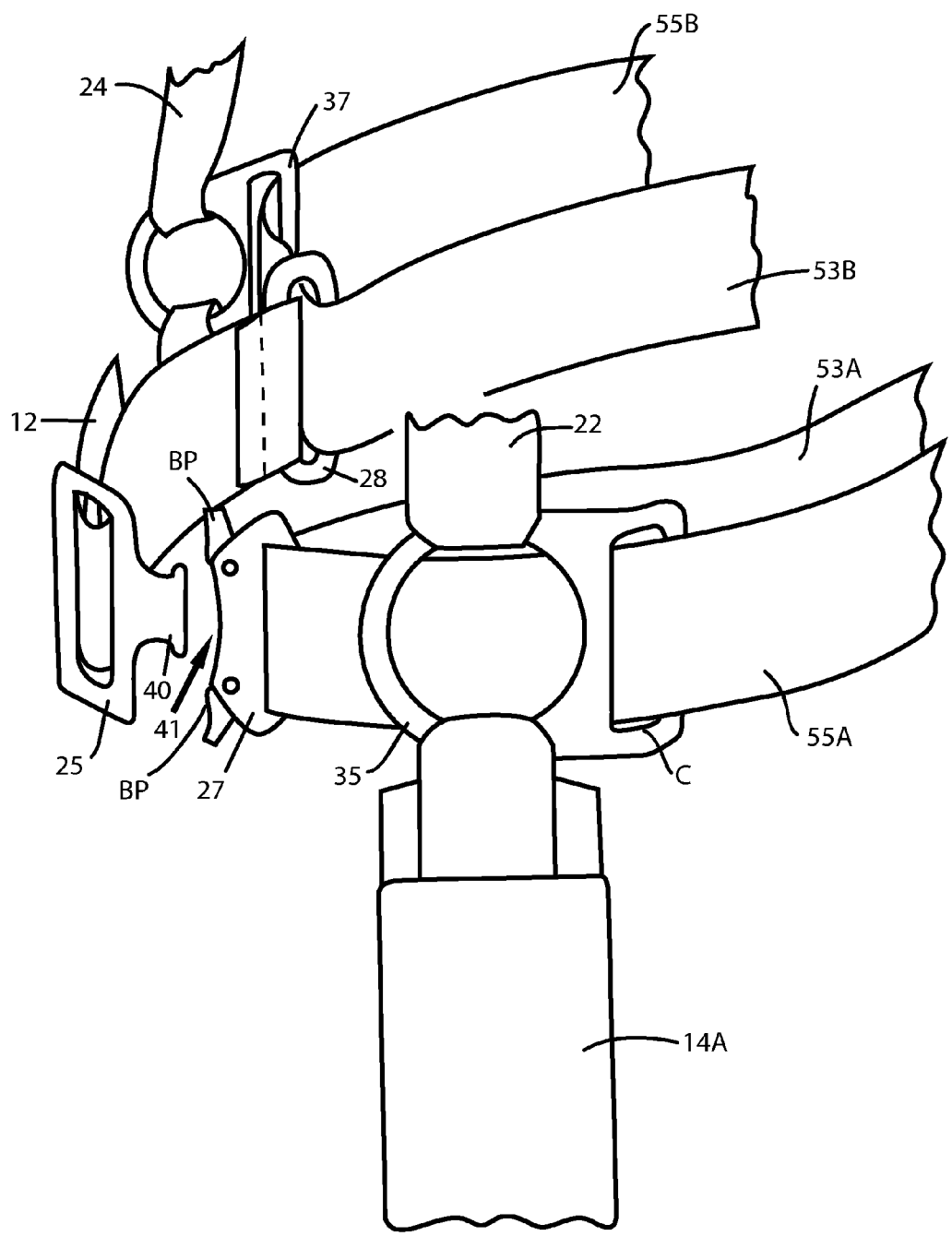
FIG. 7 shows in detail the closing means of the device according to the invention.

As represented in FIG. 7, the keeper 41 and the bolt 40 constitute the mutual hooking device to enable the connection of the waist belt 12 and this latter to provide the belt function adjustable thanks to the double loop associated to the member 25 to act as an adjusting device.

Once assembled, the half buckles 25 and 27 form the retaining buckle 26, including a lock which can be operated to be unlocked by a simultaneous pressure on two push-buttons BP.

The waist belt 12 slides through the double loop incorporated to the member 25, between the end of the waist belt 12 and the tensioning means represented by the loop 28, whereas the other half buckle 27 has a loop which delineates the segments of side transverse strap 53A and of side fastening strap 55A.

The waist belt 12 is connected by one end to a loop 28 sliding in the strap segments and acting as a tensioning means.

Thanks to the arrangement according to the invention, once the retaining buckle 26 is open, the skydiver only needs, to set in the second position, to automatically tilt backwards under the action of his own weight.

The invention can of course be applied to a tandem passenger harness, i.e. a harness which does not feature any back container incorporating the reserve and main canopies because it is intended to be coupled to the two-seater parachute harness of a tandem pilot.

This alternative of the preferred embodiment is represented in FIGS. 8 to 12, characterized in that the side fastening strap 55A and 55B is removable, particularly thanks to a particular arrangement of the straps and to the adapted hardware.

In this alternative of the invention, this configuration is particularly intended to provide a harness dedicated to transport tandem passengers.

The locking and sliding means consist of two means disposed differently from the preferred embodiment of the invention for solo parachute.

Figure 8:
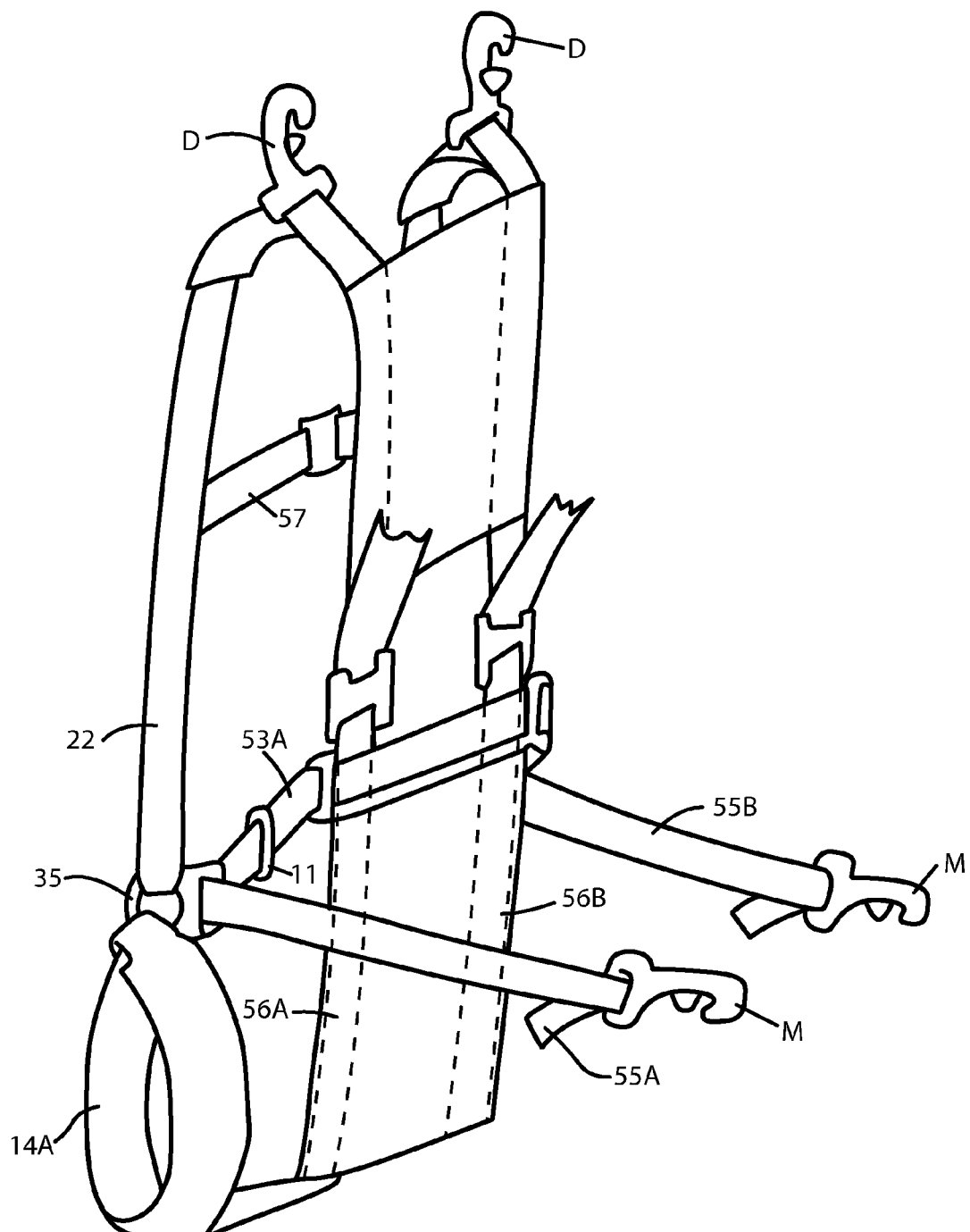
FIG. 8 is a ¾ rear view of an alternative of the device, intended for the passenger's tandem harness.
Figure 9:
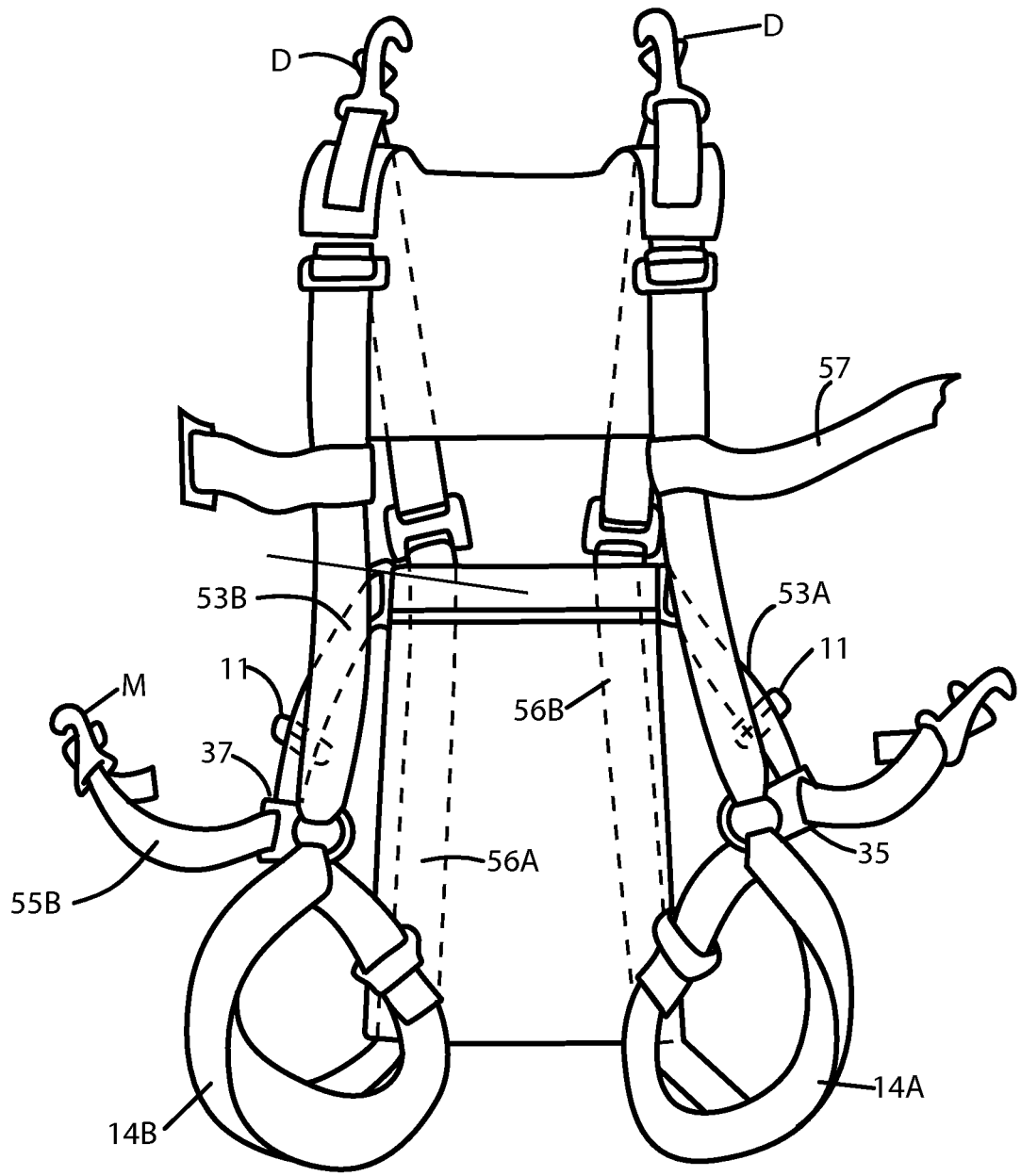
FIG. 9 is a front view of the alternative of FIG. 8.
Figure 10:
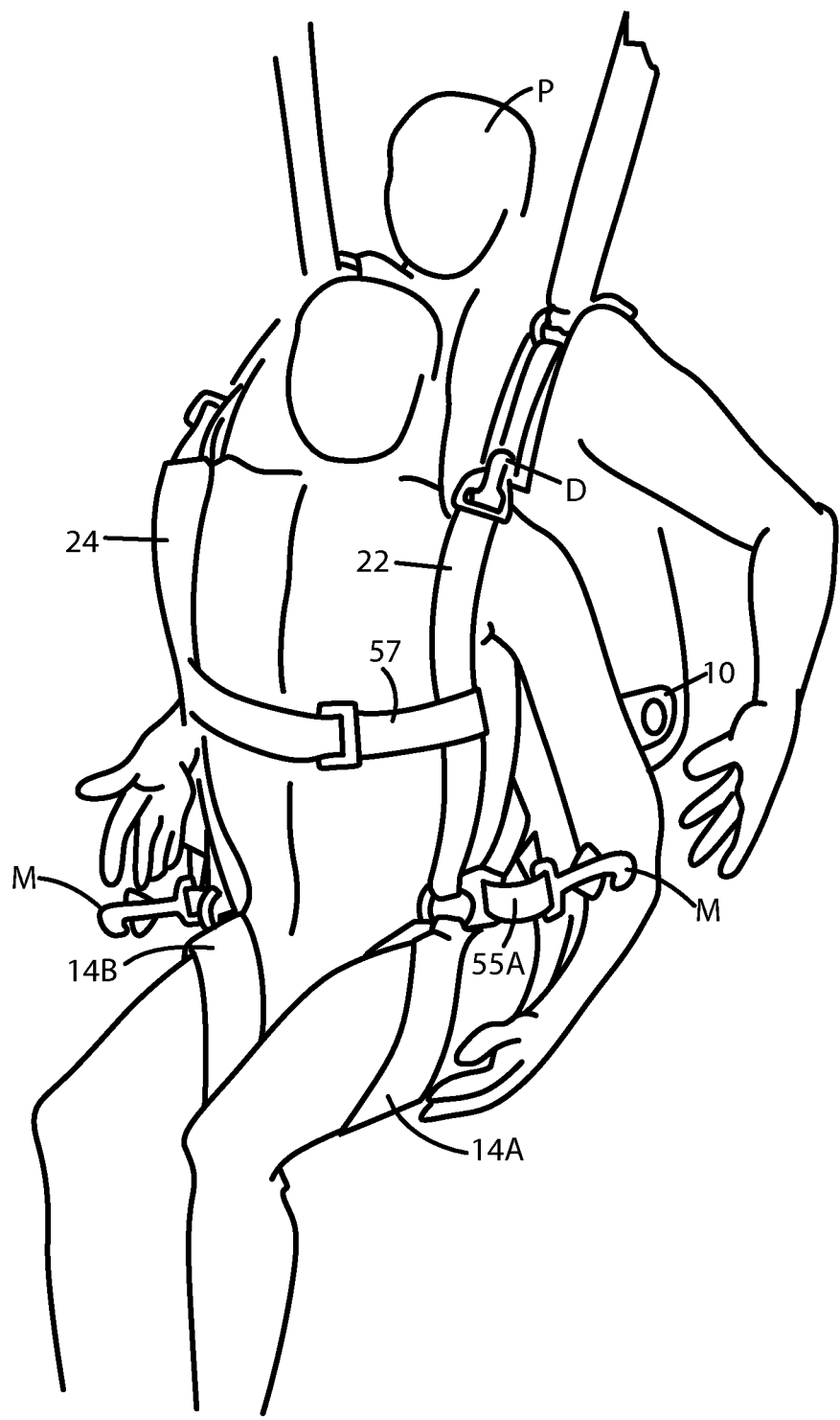
FIG. 10 is a ¾ front perspective view of the skydiver equipped with the device according to the invention, on the passenger's tandem harness in an open position.

According to the alternatives represented in FIGS. 8, 9 and 10, the assembly of straps and buckles includes a separate set of leg straps 14A, 14B fixed by one end, to a metal connecting ring provided with a loop 35,37, such as a ring connected to a main strap 22,24.

The loop associated to the connecting rings 35,37 is dedicated to the passage of the segment of the side transverse strap 53A, 53B prior to becoming the side fastening strap 55A, 55B.

The arrangement of the segments of side transverse strap 53A, 53B and side fastening straps 55A, 55B is delineated in that it includes a segment external to the loop associated to the connecting ring 35,37, this segment being the one of the side fastening strap 55A, 55B, and the segment internal to the keeper associated to the connecting ring 35,37 being the one of the side transverse strap 53A, 53B.

A hooking snap ring M provided with a tilting hook coupled to a double loop is displaced between the end of the side fastening straps 55A, 55B and the loop associated to the connecting ring 35,37. The snap ring M hooks by its tilting hook in a known way to the metal buckle 10 provided for this purpose on the container 38 or on the tandem pilot's harness.

All of the segments form a circular closed loop circuit when each snap ring M is hooked to each ring 10 of the tandem pilot's harness.

The length of each side fastening strap is adjustable by the tandem pilot P thanks to the double loop associated to the snap ring M, after this latter is hooked on the right and on the left in the ring 10 of the tandem pilot's harness.

The length adjustment of side fastening strap which has to separate the tandem passenger from the tandem pilot after its hooking, is obtained in a known manner per se, thanks to the double loop acting as an adjusting device coupled to the tilting hook, allowing the self-tightening by pulling the end of the side fastening straps 55A, 55B.

Tightening is obtained by adjusting the length of the side fastening straps 55A and 55B, operation carried out before the jump by the tandem pilot P and after the side fastening straps are hooked by their snap ring M to their respective ring 10 located on the left and on the right on the tandem pilot's harness.

Therefore in this version dedicated to the tandem passenger, instead of having only one centralized means controlling the locking-unlocking and only one centralized means controlling the tightening-loosening of the segments of side transverse straps 53A, 53B and of side fastening straps 55A, 55B which is attached to the waist belt 12, two separated means for locking and tightening as well as unlocking and loosening these straps are provided, located each one on one of the passenger harness sides.

These means are represented in FIGS. 8 to 12 by the snap rings M and their associated double loop, they are located in the Figures mentioned between the loops 13, or the loops associated to the connecting rings 35,37 and each end of the side fastening strap 55A, 55B.

The operating procedure of this alternative allows to obtain, after the parachute deployment, the unlocking of the passenger's side fastening straps 55A, 55B, and therefore the movement by transverse translation forward of the leg straps 14A, 14B, under the effect of the passenger's own weight, because the backward movement of the passenger's lower part of the back is limited by the presence of the pilot P behind him.

Transverse translation is intended to mean any continuous or discontinuous straight displacement in a direction substantially perpendicular to the vertical of the standing passenger.

A tension limiting buckle 11 is provided on the segments of side transverse strap 53A, 53B between the middle of the back transverse strap 53 and each loop in order to prevent, during the adjustment before the jump, the possibility to shorten the length pre-adjusted on the ground, of the segments of side transverse strap 53A, 53B in order not to compress the tandem passenger's body while tightening the side fastening straps 55A, 55B and the side transverse straps operated by the tandem pilot P.

The course of the segments of side transverse strap 53A, 53B is ensured by its extension at the expense of the segments of side fastening straps 55A, 55B obtained by releasing each snap ring M by simply tilting the hook out of its ring 10 as shown in FIG. 10.

The <<clearance>> generated by releasing the side fastening straps 55A, 55B is compensated by the extension of the side transverse straps 53A, 53B. The extension of the inner segments (transverse back straps 53A, 53B) is thus simultaneously obtained by reducing on the right and on the left of the outer segments (side fastening straps 55A, 55B).

This causes the tilting movement of the passenger under its own weight, thereby enabling the passenger to seat down until each snap ring M abuts the loop of the respective connecting ring 35,37.

The seated position taken by the tandem passenger is ensured by the progress of the leg straps 14A, 14B, until the abutment of said snap rings M against the slot C of each loop, contrary to the device for the solo harness, where the seated position taken by the solo skydiver is ensured by the possible backward movement of the lower part of the back.

While unlocking the snap rings M, the length adjusted by the pilot P of the side fastening straps 55A, 55B conditions at first the possible course length of the segments of side transverse straps 53A, 53B, however this length can be more important if secondly the pilot P slides the side fastening straps in the double loops coupled to the snap rings M until he brings them to the end of the side fastening straps 55A, 55B.

As in the preferred embodiment of the invention, progressively releasing the outer segments (side fastening straps 55A, 55B) is possible by manual intervention on the double loop coupled to the snap ring M, the pilot P causes the progressive loosening of the side fastening straps 55A, 55B of the tandem passenger's harness.

We also note that for a similar result, some pilots P prefer to maintain the snap ring M locked in its ring 10 and only to loosen the side fastening straps 55A, 55B.

After having pulled on the leg straps 14A, 14B and the passenger's harness like a jacket or a harness, the tandem passenger is hooked in his harness on the one hand to the tandem pilot P's harness at the top of these main straps 22,24, by both load snap rings D and on the other hand he is hooked sidewise by both snap rings M by means of two rings 10 disposed on the sides of the container 38 of the pilot P's harness, as known in the prior art.

It is to be noted that both rings 10 used as hooking devices to the snap rings M can also be disposed on the pilot P's load bags when the load bag is placed behind the tandem pilot's thighs.

For tightening, the pilot P just needs to pull on the ends of the side fastening straps 55A, 55B which protrude from the double loops to obtain an adjustment adapted to the size of the tandem passenger harness wearer.

Once the tightening of the side fastening straps 55A, 55B is done, no more sliding is allowed until a new manual intervention, intervening after the main canopy deployment consisting in unlocking or loosening the side fastening straps 55A, 55B, an operation traditionally done by the pilot P during a tandem jump, because his position is better to have access to it.

As an alternative of the embodiment not shown, a waist belt can be added as, for example, a connection buckle connected by an attachment strap to one of the connecting rings equipped by a loop 35 or 37, in order to maintain the connecting members between them and to modify the pull angle on the main straps 22,24.

The waist belt will be, in another example, divided into two straps: a strap fixed by one end to one of the main right or left straps is connected by its other terminal end to a tightening buckle and the other strap is fixed by one end to the other main strap.

Figure 11:
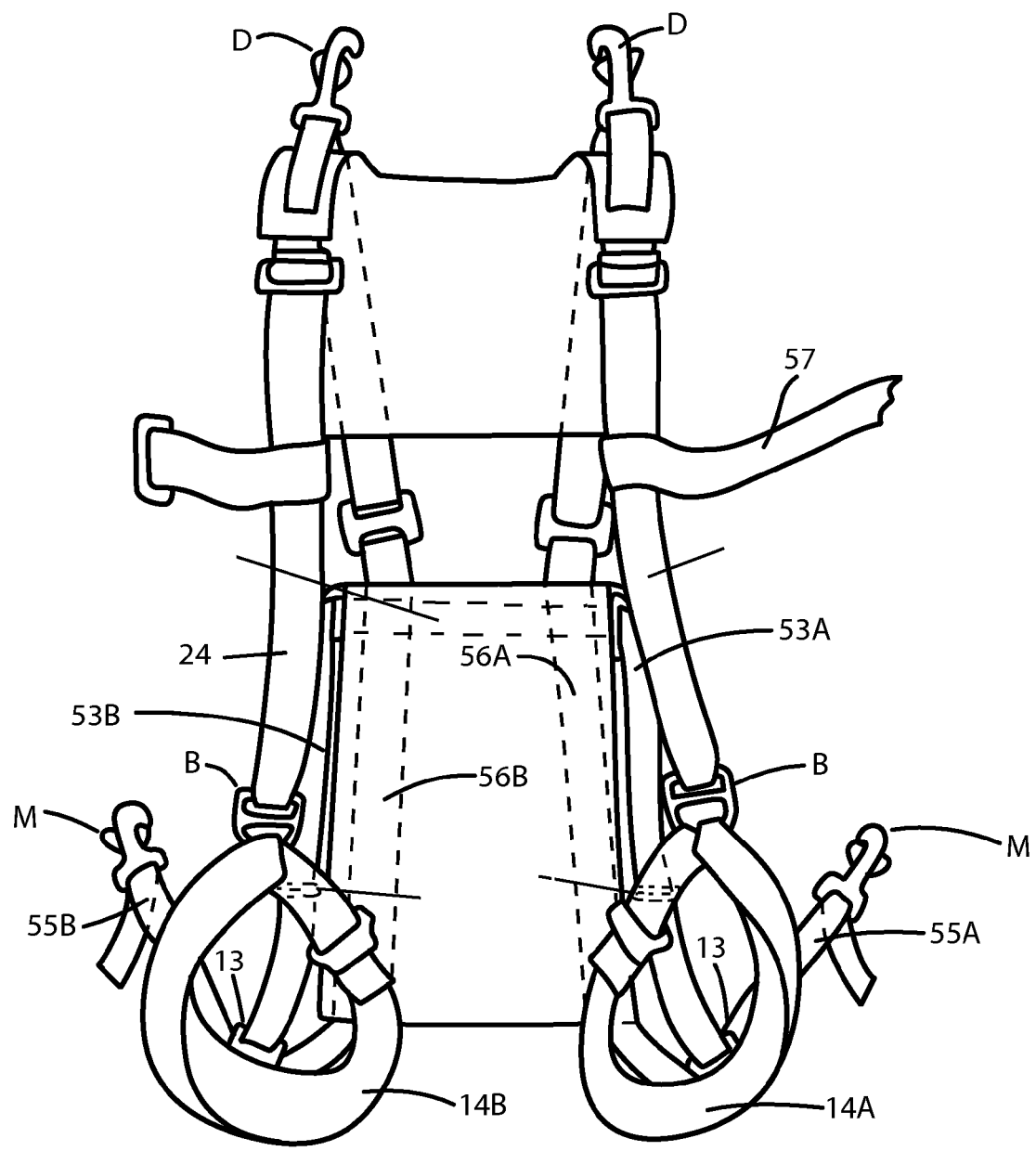
FIG. 11 is a front view of the device according to the invention showing an alternative intended for the passenger's tandem harness.

An alternative path of the segments of side transverse straps 53A, 53B and of side fastening straps 55A, 55B in a front view in FIG. 11 shows that a loop 13 is disposed on each side of the leg straps 14A and 14B, each loop 13 enabling the sliding of the segment of the side transverse strap 53A, 53B and of the segment of side fastening strap 55A, 55B instead of the passage in the slot C of the loop of the connecting ring 35,37.

Each loop 13 can be half-moon shaped in order to ease the sliding of the segments of side transverse strap 53A, 53B becoming side fastening strap 55A, 55B.

The junction between the main straps 22,24 and the leg straps 14A, 14B is for example ensured by a buckle B.

In this way, the tightening traction of the side fastening straps intended to connect the tandem pilot P to the passenger is transmitted at the top of the passenger's lower limbs, for a better support.

Indeed, this alternative of the device according to the invention is advantageous during tandem jumps because it ensures a limitation of a downward movement of the tandem passenger's legs, which cannot pass under his own centre of gravity.

On each side of the segments of side transverse straps is disposed a tension limiting buckle 11 (not shown on FIG. 10) to ensure that the tightening of the side fastening straps does not compress the tandem passenger's body.

Figure 12:
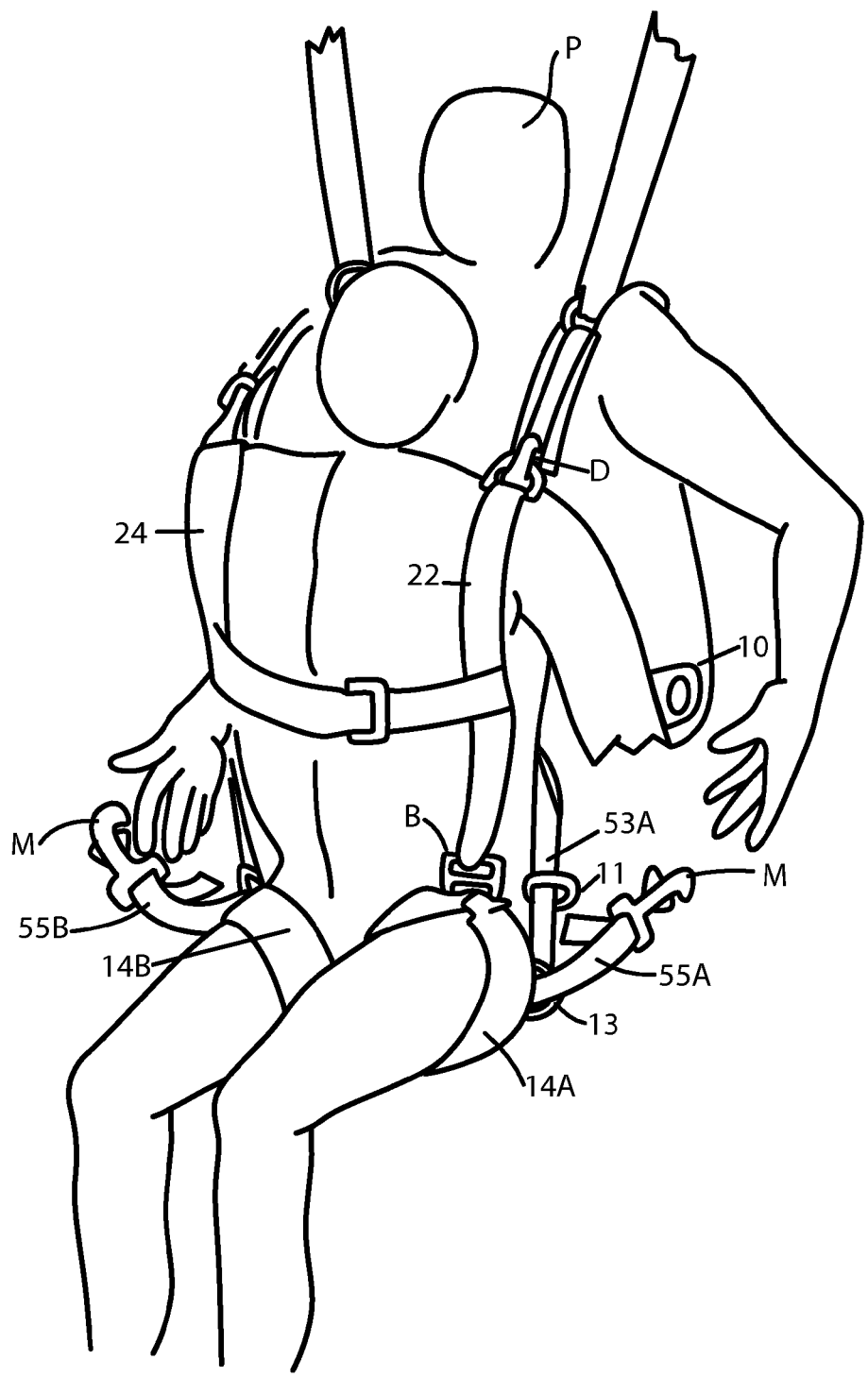
FIG. 12 is a ¾ front perspective view of the skydiver equipped with an alternative type shown in FIG. 11 of the device according to the invention, on the passenger's tandem harness in an open position.

When the pilot P unlocks the snap rings M as represented in FIG. 12, the extension of the segments of the side transverse strap proceeds the same way by reduction of the length of the segments of the side fastening strap, until the snap rings M abut the loops 13, allowing the forward translation movement of the leg straps 14A, 14B.

The embodiment dedicated to the tandem passenger's harness with its two locking means and its two tightening means can also be intended for a solo harness.

In another embodiment of the device according to the invention for solo harness is provided a waist belt length on which would be disposed several holes with a buckle provided with a tongue. This buckle disposed slidable in one of the segments of side transverse strap-side fastening strap would replace the half buckle 27 sliding in the previously described preferred embodiment, the waist belt adjustment being done by means of holes disposed in the waist belt length, or by any other closing means providing the blocking and adjusting of the waist belt such as a snap fit constituted by a male and female quick release buckle for example, or by a snap ring grasping a buckle, or those of the adjustable magnetic closing type, self-fastening means, control knob, locking knob, catches to enable a quick and effective adjustment depending on the wearer's morphology, etc.

Although the preferred embodiment of the invention includes buckles having a control device to simultaneously unhook the right and left segments associated to a tightening-loosening means, it is well understood that a locking-unlocking control device distinct from a tightening-loosening means is also contemplated.

The waist belt can be made up of several strap segments, including a segment on the user's right and another on his left, provided on each side with a tightening means.

The other harness parts, the arrangement of the different straps different from the segments of side transverse straps and of side fastening straps can of course vary.

The loop in metal material between side transverse straps 53A, 53B and side fastening straps 55A, 55B can in particular be in a textile material.

The loop can indifferently run through by a segment of side transverse straps 53A, 53B or a segment of side fastening straps 55A, 55B.

In the preferred embodiment represented in the drawings, the slot C of the loop associated to the connecting rings 35, 37 is dedicated to the passage of the segments of side fastening straps 55A, 55B but their use could be limited to the passage of the segments of side transverse straps 53A, 53B.

The saddle straps 56A, 56B, constituting textile supports, are interconnections which give a good comfort of use, an optimal distribution of the efforts on the user's back and a mechanical strength ensuring the safety by inhibiting the backward tilting of the body and limit according to their length the change from the semi-seated position to the supine position.

Saddle straps 56A, 56B can be crossed or parallel with a link to link them to each other not at their ends, as such a <<H>>-shaped link for example, and/or be covered by a fabric piece or a net acting as a saddle support constituting a pouch intended for containing a padding.

Said pouch can be provided with a removable reinforcing plate in an advantageous way in Millar, adapted to the size and shape of said pouch for example, or even consist of an inflatable bag by wind action according to the invention of Meyer in the European patent application 93810843.8, as this is the case with the harnesses intended to paragliding.

The harness according to the invention can be provided with a support with cushion structure, the excess of saddle straps which exists before the declutching done under canopy, can be reduced while maintaining their clearance, by removable retention means such as elastics fixed along the length of the saddle straps to partially move them toward each other, or by magnets disposed to ensure the superposition of the saddle straps on themselves.

These configurations enable the user to reduce the excess of saddle straps before their actuation, i.e. before releasing the back transverse strap.

This type of configuration leaves the total degree of freedom to the saddle straps, and the retention means being removable, the user can thus change them depending on his needs.

The invention claimed is:

1. A skydiving harness, configured to cooperate with a back container, the harness comprising:
    first and second main straps, each main strap extending at one end into a shoulder strap, then into a back strap, the ends of both back straps being connected to a back transverse strap;
    first and second leg straps, an end of each of the first and second main straps being connected to a fastening point of the first and second leg straps, respectively;
    first and second side transverse straps, connected at one end to the back transverse strap, and extending into first and second side fastening straps, respectively, which are attachable to a lower part of the back container, each side transverse strap or each side fastening strap being configured to slide in a loop, which is integrally formed with the associated main strap with the associated leg strap, each side transverse strap or associated side fastening strap having a tensioning means coupled to a hooking means carried by one side transverse strap or the associated side fastening strap cooperating to hook on the hooking means of the other side transverse strap or associated side fastening strap or by a hooking means carried by the back container;
    saddle straps extending between the back transverse strap or the back straps and each one of the leg straps; and tightening and loosening means of the side transverse straps and of the associated side fastening straps, wherein the harness is switchable from a first position in which the harness is tightly maintained during freefall on a body of the skydiver using the skydiving harness without the skydiver resting on the saddle straps by hooking means of the side transverse straps or the associated side fastening straps and tightening of the tightening and loosening means, to a second position in which the skydiver rests on the saddle straps, the second position being achieved after the canopy deployment by totally unhooking the hooking means or the hooking means being kept hooked to the hooking means of the back container, gradually loosening the tightening and loosening means.

2. The skydiving harness according to claim 1, cooperating with the back container to form a parachute pack of an individual skydiver or of a pilot skydiver, wherein each side fastening strap of the harness is sewn by one end to the lower part of the back container, and wherein each tensioning means is directly carried by and delineates the junction between the side transverse strap and the side fastening strap, the side fastening straps and the side transverse straps being tensioned by hooking means coupled to the tensioning means on a belly of the skydiver.

3. The skydiving harness according to claim 2, further comprising a waist belt member, carrying at one end a loop constituting the tensioning means, sliding on one side transverse strap and the associated side fastening strap, the waist belt member also carrying a link element which constitutes the hooking means and which is provided with a member cooperating with the waist belt member to allow fixation of the link element on the waist belt member, wherein the complementary tensioning means consists of
  a loop, sliding on the other side transverse strap and the associated side fastening strap, and
  a keeper, mounted on the loop and constituting the hooking means, receiving the link element by locking to tension the side transverse straps and the associated side fastening straps.

4. The skydiving harness according to claim 3, wherein the member cooperating with the waist belt member is a double loop type, allowing the adjustment of the hooking means position on the waist belt member and constituting the tightening and loosening means of the side transverse straps and the associated side fastening straps, loosening of the tightening and loosening means allowing the passage of the skydiving harness from the first position to the second position when the hooking means are attached.

5. The skydiving harness according to claim 1, cooperating with the back container to form a parachute pack of an individual skydiver or of a pilot or tandem skydiver, wherein each side fastening strap is adapted to be removably connected to the lower part of the back container, and wherein the tensioning means of the side transverse straps and the side fastening straps are carried by both of the side fastening straps and are coupled to the hooking means respectively in order for the hooking means to cooperate with the hooking means carried by the lower part of the back container, the connection of the hooking means to the hooking means on the lower part of the back container allowing the tensioning of the side transverse straps and the side fastening straps.

6. The skydiving harness according to claim 5, wherein each tensioning means carried by a side fastening strap consists of
  a member cooperating with the side fastening strap to tension the side fastening straps and the corresponding side transverse straps, and
  a snap ring constituting the hooking means and coupled to said member cooperating with the side fastening strap, and
wherein the hooking means carried by the lower part of the back container consists of a ring on which is locked the snap ring to tension the side fastening straps and the corresponding side transverse straps.

7. The skydiving harness according to claim 6, wherein the member cooperating with the side fastening strap is a double loop type, allowing the position adjustment of the tensioning means on the corresponding side fastening strap and constituting the tightening and loosening means of the side transverse straps and the associated side fastening straps, loosening of the tightening and loosening means allowing the skydiving harness to switch from the first position to the second position when the hooking means are attached.

8. The skydiving harness according to claim 1, wherein the skydiving harness is configured to constitute a passenger harness of a tandem harness provided with a pilot parachute pack and a passenger harness, wherein the tensioning means of the side transverse straps and the side fastening straps are carried by both of the side fastening straps and are coupled to the hooking means of the back container, respectively, so that the hooking means cooperate with the hooking means carried by the lower part of the back container, the connection of the hooking means to the hooking means on the lower part of the back container allowing tensioning of the side transverse straps and the side fastening straps.

9. The skydiving harness according to claim 8, wherein each tensioning means carried by a side fastening strap consists of
  a member cooperating with the side fastening strap to tension the side fastening straps and the corresponding side transverse straps, and
  a snap ring coupled to said member cooperating with the side fastening strap, and
wherein the hooking means carried by the lower part of the back container consists of a ring on which is locked the snap ring to tension the side fastening straps and the corresponding side transverse straps.

10. The skydiving harness according to claim 9, wherein the member cooperating with the side fastening strap is a double loop type, allowing the position setting of the tensioning means on the corresponding side fastening strap and constituting the tightening and loosening means of the side transverse straps and the associated side fastening straps, loosening of the tightening and loosening means allowing the harness to switch from the first position to the second position when the hooking means are attached.

11. The skydiving harness according to claim 1, wherein two loops are sewn on the back transverse strap, each side transverse strap sliding through one of the loops and extending after the respective loop into one of the saddle straps to obtain a configuration with crossed and non-crossed saddle straps, the side transverse straps and the saddle straps being connected to the back transverse strap by the loops.

12. The skydiving harness according to claim 1, wherein the saddle straps and the side transverse straps are sewn on the back transverse strap.

13. The skydiving harness according to claim 5, wherein the loop into which each side fastening strap and its the associated side transverse strap slide is carried by the associated leg strap.

14. The skydiving harness according to claim 1, wherein the loop into which each side fastening strap or the associated side transverse strap slide is carried by a connecting area between the main strap and the associated leg strap.

15. The skydiving harness according to claim 1, wherein tension limiting buckles of the side fastening straps and of the side transverse straps are sewn, on the side transverse straps, in order to limit the tensioning when the hooking means are operated to tension the side transverse straps and the side fastening straps.

16. The skydiving harness according to claim 1, wherein the saddle straps are elastic.

17. The skydiving harness according to claim 1, wherein the saddle straps are assembled by a textile material piece, which is a wrinkled fabric piece, wrinkled by the elasticity of the saddle straps, to keep the saddle straps into a retracted position until the skydiver is in the second position.

18. A tandem harness, comprising: a passenger skydiving harness comprising the skydiving harness according to claim 2, configured to constitute a passenger harness of the tandem harness provided with a pilot parachute pack and the passenger skydiving harness, the pilot parachute pack comprising the parachute pack according to claim 2,
wherein the main straps of the passenger skydiving harness carry fastening means cooperating with means carried by the main straps of a pilot parachute pack, and
wherein the tensioning means of the side transverse straps and the side fastening straps are carried by both of the side fastening straps and are coupled to the hooking means, respectively, so that the hooking means cooperate with the hooking means carried by the lower part of the back container, the connection of the hooking means to the hooking means on the lower part of the back container allowing tensioning of the side transverse straps and the side fastening straps; and the pilot parachute pack according to claim 2.

* * * * *